No. 723,547. PATENTED MAR. 24, 1903.
J. RADCLIFFE.
DRYING APPARATUS.
APPLICATION FILED JAN. 12, 1903.
NO MODEL. 2 SHEETS—SHEET 1.

WITNESSES
F. W. Wright
E. W. Collins

INVENTOR
JAMES RADCLIFFE
BY Howson and Howson
HIS ATTORNEYS

No. 723,547. PATENTED MAR. 24, 1903.
J. RADCLIFFE.
DRYING APPARATUS.
APPLICATION FILED JAN. 12, 1903.
NO MODEL. 2 SHEETS—SHEET 2.

WITNESSES:
G. W. Wright.
E. W. Collins

INVENTOR
JAMES RADCLIFFE
By Howson and Howson
HIS ATTORNEYS.

UNITED STATES PATENT OFFICE.

JAMES RADCLIFFE, OF HERNE HILL, LONDON, ENGLAND.

DRYING APPARATUS.

SPECIFICATION forming part of Letters Patent No. 723,547, dated March 24, 1903.

Application filed January 12, 1903. Serial No. 138,722. (No model.)

*To all whom it may concern:*

Be it known that I, JAMES RADCLIFFE, engineer, a subject of the King of Great Britain and Ireland, residing at "Fernbrae," Cosbycote avenue, Herne Hill, in the county of London, England, have invented certain new and useful Improvements in Drying Apparatus, of which the following is a specification.

My invention has for its object to provide a drying apparatus which is especially adapted for drying electric cables, but is also applicable to other drying purposes, it being simple in construction, efficient in operation, and not liable to readily get out of order.

According to my invention I provide an outer casing within or partly within which I arrange a steam-channel extending around or partly around the interior of the said casing, and from this channel extend tubes of U shape, with the two ends of each of them expanded into the said channel, the said tubes being so arranged that they extend around or partly around the sides or walls and also across the end of the space in the interior of the casing, as hereinafter described. Means are provided for introducing steam into the aforesaid steam-channel and for conveying away exhaust-steam and water of condensation from the said channel, one end of each of the said tubes opening into a part of the said channel to which steam is admitted and the other end of each of the tubes opening into a part of the said channel from which the exhaust-steam and water of condensation pass. The space within the casing is provided with a pipe or passage, by which it is connected with an exhauster and with a condenser, if desired. An opening is provided in any suitable position (preferably at the front end) for the admission of the goods or matter to be dried, the said opening being provided with a door or cover, by which it can be tightly closed.

The accompanying drawings represent an apparatus constructed in accordance with my invention.

Figure 1:
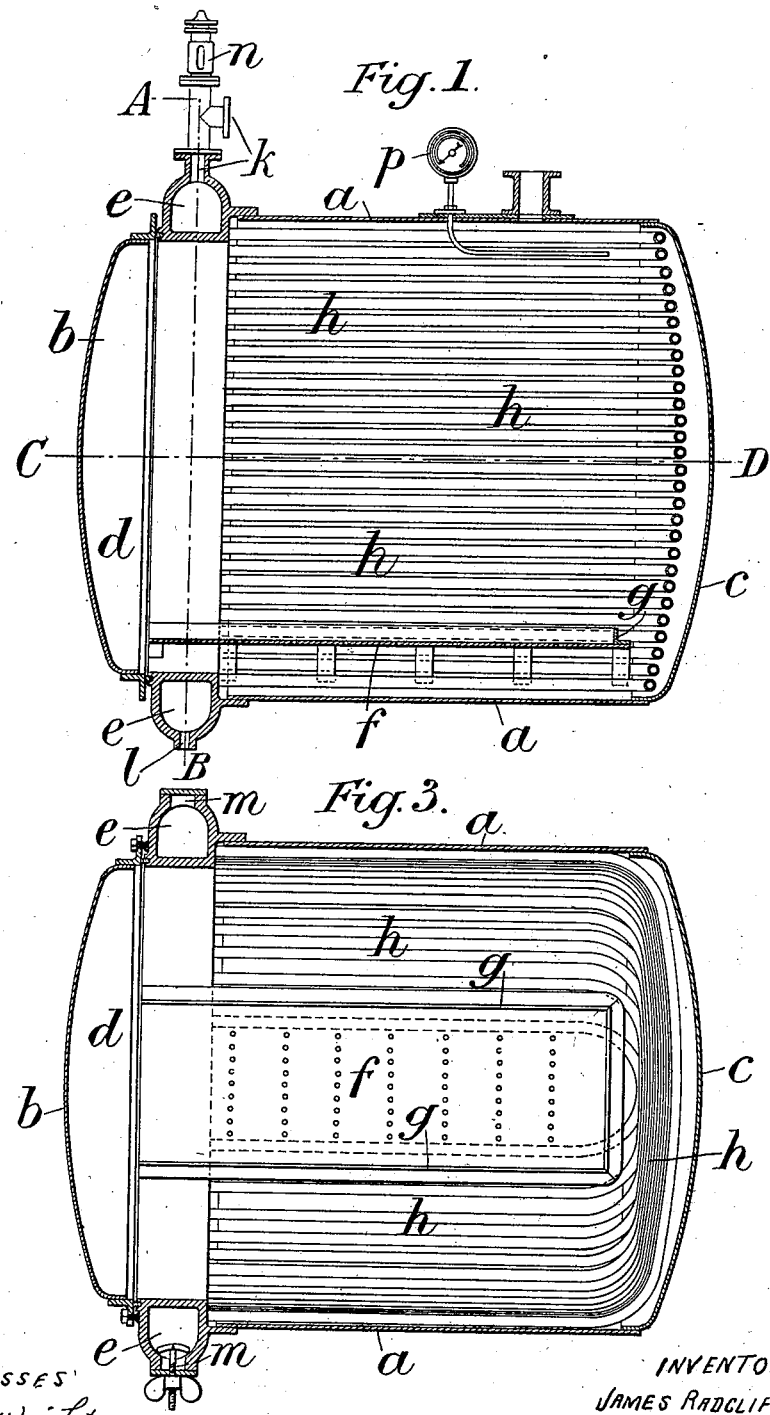
Figure 2:
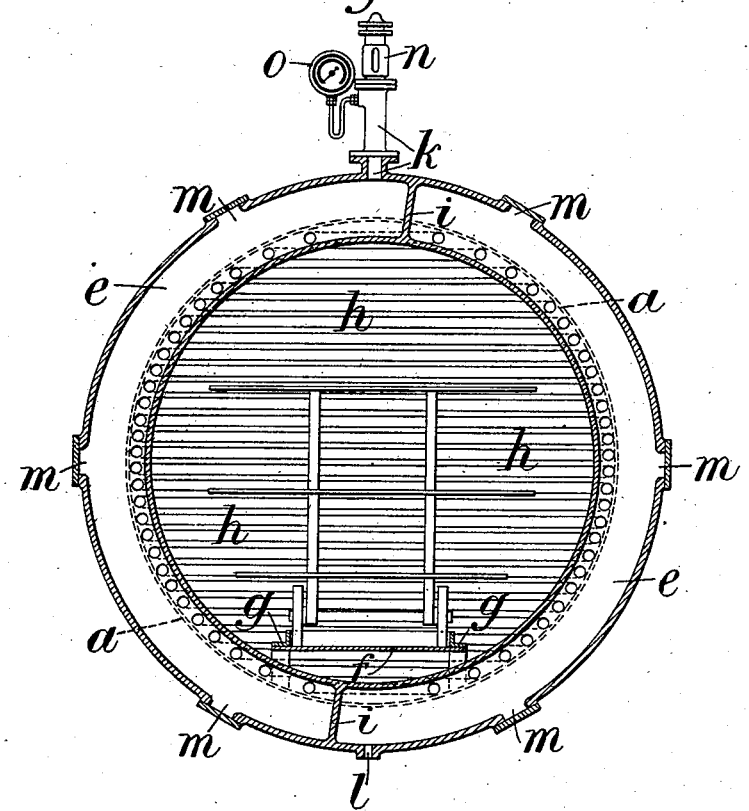

Figure 1 is a central longitudinal vertical section. Fig. 2 is a transverse section on the line A B, Fig. 1; and Fig. 3 is a longitudinal horizontal section on the line C D, Fig. 1.

The casing $a$ consists of a horizontal cylinder with dome-shaped ends $b$ $c$, one of which is arranged as a door $d$, which can be tightly closed by screwed hinged bolts and nuts or other convenient means, the said door being provided with an eyebolt or eyebolts, by which it can be lifted and removed and replaced as required.

The steam-channel $e$ consists of an annulus or a partial annulus extending at or near the door end, preferably around the casing $a$, and extending wholly or in part, as shown, into the interior of the said casing. The floor $f$ is arranged at a suitable elevation to allow of a truck (carrying the cables or other articles to be dried) being run onto rails or guides $g$ on the said floor $f$. $h$ represents tubes of U shape, having their ends expanded into the inward wall of the steam-channel $e$, which is arranged to allow steam to pass into, through, and from the tubes $h$, the said channel $e$ being divided by partitions $i$ into two compartments, into one of which compartments one end of each of the tubes $h$ opens and into the other of which compartments the other end of each of the said tubes $h$ opens. $k$ is a steam-inlet to which the steam-admission pipe is connected, and $l$ is an outlet for exhaust-steam and water of condensation from the channel $e$. The said tubes $h$ extend side by side along the interior of the casing $a$, their bends passing across the end of the said interior, as shown, so that the said tubes $h$ surround or partly surround the space in which the goods to be dried are received. After the goods are in place the door $d$ is tightly closed and steam is admitted through the inlet $k$, the said steam passing through the tubes $h$ to the outlet $l$, the exhauster being put in operation so as to withdraw air and moisture from the interior of the casing $a$ and pass them into a condenser, if it be desired to recover the liquid of condensation. The tubes $h$ being U-shaped and arranged as described have freedom of movement, so that they freely contract and expand under variations of temperature, and thus the tubes and joints are not liable to get out of order.

The outer wall of the channel $e$ may be provided with openings closed by screw-plugs and opposite the ends of the tubes $h$, passing through the opposite wall of the said channel $e$. The said channel $e$ may be provided with hand-holes at intervals, as shown at m, for giving access to the interior of the said channel, the said hand-holes being closed by suitable covers secured by bolts and nuts or any other suitable fastenings.

n is a safety-valve, and o is a steam-pressure gage.

p is a thermometer communicating with the interior of the casing a for the purpose of indicating the temperature inside the casing a.

The arrangement of chamber and tubes described and illustrated is especially adapted for drying cables, but it is also applicable to drying other articles.

Although I have described the heating as being effected by steam, it will be understood that other suitable heating agent can be used instead—such, for instance, as hot air or gas.

The casing a may be of other shape than that shown. For example, it may be rectangular in cross-section.

Having now particularly described and ascertained the nature of the said invention and in what manner the same is to be performed, I declare that what I claim is—

A drying apparatus consisting of or comprising a tightly-closable chamber provided, at, or toward, one end, with a channel for a heating agent, which channel is divided into inlet and outlet compartments with which the ends of U-shaped tubes respectively communicate, the respective legs of each of the said tubes extending along opposite sides, or walls, of the said chamber and the bends of the said tubes extending across the end of the said chamber, substantially as and for the purposes hereinbefore described.

In testimony whereof I affix my signature in presence of two witnesses.

JAMES RADCLIFFE.

Witnesses:
  WILLIAM GERALD REYNOLDS,
  PERCY READ GOLDRING.